United States Patent
Geiger et al.

(10) Patent No.: US 9,662,822 B2
(45) Date of Patent: May 30, 2017

(54) METHOD FOR MANUFACTURING A CONTAINER BODY OF A TUBE AND CONTAINER BODY MANUFACTURED BY SUCH A METHOD

(75) Inventors: Andreas Geiger, Heimberg (CH); Philippe Kern, Munsingen (CH)

(73) Assignee: Hoffmann Neopac AG, Thun (CH)

( * ) Notice: Subject to any disclaimer, the term of this patent is extended or adjusted under 35 U.S.C. 154(b) by 83 days.

(21) Appl. No.: 14/427,642

(22) PCT Filed: Sep. 13, 2012

(86) PCT No.: PCT/CH2012/000215
§ 371 (c)(1),
(2), (4) Date: Jul. 22, 2015

(87) PCT Pub. No.: WO2014/040195
PCT Pub. Date: Mar. 20, 2014

(65) Prior Publication Data
US 2015/0352769 A1   Dec. 10, 2015

(51) Int. Cl.
*B29C 47/02* (2006.01)
*B29C 37/00* (2006.01)
(Continued)

(52) U.S. Cl.
CPC ........ *B29C 47/021* (2013.01); *B29C 37/0025* (2013.01); *B29C 53/36* (2013.01);
(Continued)

(58) Field of Classification Search
CPC ........ B65D 81/386; B65D 85/08; B65D 3/00; B65D 3/06; B29C 47/021; B29C 53/36;
(Continued)

(56) References Cited

U.S. PATENT DOCUMENTS 2,539,450 A * 1/1951 Magill ...................... B31C 3/00
156/195
2,623,444 A * 12/1952 Maier et al. .............. B31B 1/74
156/202
(Continued)

FOREIGN PATENT DOCUMENTS

DE   102009051071 A1   4/2011
EP       1500602 A1   1/2005
(Continued)

OTHER PUBLICATIONS

International Search Report for PCT Application PCT/CH2012/000215 dated Apr. 30, 2013.
(Continued)

*Primary Examiner* — Christopher Demeree
(74) *Attorney, Agent, or Firm* — McCormick, Paulding & Huber LLP

(57) ABSTRACT

The invention relates to a method for manufacturing a container body (20) of a tube, the methods comprising the steps of imprinting a sheet material (10) on one of its surfaces, bending the imprinted sheet material into the shape of the container body (20) of the tube with the imprinted surface on the outside, sealing adjacent edges (15) of the bent imprinted sheet material, and coating the bent imprinted sheet material with a transparent plastics sheathing (17) by extrusion, wherein the material of the plastics sheathing (17) and/or the ink used for imprinting are chosen such that the plastics sheathing (17) does not adhere to the imprint (14), resulting in one or more ventilation areas (18) being formed between the imprinted sheet material and the plastics sheathing (17). The invention furthermore relates to a container body manufactured by such a method.

20 Claims, 3 Drawing Sheets

(51) Int. Cl.
| | |
|---|---|
| *B65D 85/08* | (2006.01) |
| *B29C 53/36* | (2006.01) |
| *B29C 53/40* | (2006.01) |
| *B65D 35/02* | (2006.01) |
| *B29K 101/12* | (2006.01) |
| *B29L 23/00* | (2006.01) |
| *B29K 23/00* | (2006.01) |
| *B29K 701/12* | (2006.01) |

(52) U.S. Cl.
CPC .............. *B29C 53/40* (2013.01); *B65D 35/02* (2013.01); *B65D 85/08* (2013.01); *B29K 2023/0633* (2013.01); *B29K 2023/0641* (2013.01); *B29K 2023/12* (2013.01); *B29K 2101/12* (2013.01); *B29K 2701/12* (2013.01); *B29L 2023/00* (2013.01); *B65D 2203/00* (2013.01); *Y10T 156/1038* (2015.01)

(58) Field of Classification Search
CPC .. B29C 37/0025; B29C 66/49; B29K 2101/12
USPC .......... 229/103.11, 902, 904, 906, 903, 5.84, 229/939, 93, 4.5, 202, 198.2, 201; 206/551, 69; 156/218, 195, 244.13, 466; 138/144, 128, 129; 493/299; 210/497.01
See application file for complete search history.

(56) References Cited

U.S. PATENT DOCUMENTS 3,660,194 A    5/1972  Hoffmann et al.
2013/0129874 A1*  5/2013  Fenske ................ A21D 10/025
                                                     426/128

FOREIGN PATENT DOCUMENTS

| JP | 2008184182 A | 8/2008 |
|---|---|---|
| WO | 2010135843 A1 | 2/2010 |

OTHER PUBLICATIONS

Article—Digital printing. Last modified Jan. 19, 2015. In Wikipedia from http://en.wikipedia.org/wiki/Digital_printing. pp. 1-4.
Article—Flexography. Last modified Feb. 4, 2015. In Wikipedia from http://en.wikipedia.org/wiki/Flexography. pp. 1-6.
Article—Ink. Last modified Feb. 20, 2015. In Wikipedia from http://en.wikipedia.org/wiki/Ink. pp. 1-9.
Article—Plastics extrusion. Last modified Jan. 9, 2015. In Wikipedia from http://en.wikipedia.org/wiki/Plastics_extrusion. pp. 1-8.
Article—Varnish. Last modified Mar. 8, 2015. In Wikipedia from http://en.wikipedia.org/wiki/Varnish. pp. 1-8.

* cited by examiner

METHOD FOR MANUFACTURING A CONTAINER BODY OF A TUBE AND CONTAINER BODY MANUFACTURED BY SUCH A METHOD

CROSS-REFERENCE TO RELATED APPLICATION

This application is entitled to the benefit of and incorporates by reference subject matter disclosed in International Patent Application No. PCT/CH2012/000215 filed on Sep. 13, 2012.

TECHNICAL FIELD

The invention relates to a method for manufacturing a container body for a tube and to a container body manufactured by such a method according to the preambles of the independent claims.

BACKGROUND OF THE INVENTION

Tubes are often used, for example, in medical and pharmaceutical applications for storing products in the form of pastes, jellies, emulsions, liquids, foams, powders, etc. Typically the container body of such a tube is imprinted on its outer surface, for example, with a product name. However, subject to external influences the characteristics of the ink used for imprinting may alter. External influences may be chemical, mechanical and/or physical in nature. Furthermore, the tube container typically collapses when the product is dispensed unless air is allowed to pass into the tube container during dispensing.

To protect the imprint from external influences tubes are typically varnished after imprinting. Varnish is usually a combination of a resin, a thinner or solvent and additives such as photoinitiators and so on (http://en.wikipedia.org/wiki.Varnish) and comprises components that may migrate through the sheet material of the container body and contaminate the product even if only a thin layer of varnish is applied.

Often a laminate is used as sheet material for the container body of the tube, the laminate consisting of several layers adhered to each other. The laminate in particular comprises a carrier layer that is sandwiched between two thermoplastic layers as described in U.S. Pat. No. 3,660,194 A and WO 2010/135843 A1. The carrier layer usually constitutes a barrier layer, i.e. it has low permeability. Suitable materials for the carrier layer are for example aluminium, $SiO_x$, $Al_xO_y$, ethylene vinyl alcohols (EVOH), cyclic olefin copolymer (COC) among others. In case of the carrier layer being an aluminium foil, an exemplary sheet material in form of a laminate is composed of the aluminium foil sandwiched between two thermoplastic layers with adhesive layers between the aluminium foil and each thermoplastic layer (i.e. thermoplastic layer—adhesive layer—aluminium foil—adhesive layer—thermoplastic layer). Polyethylene (PE), in particular low-density polyethylene (LDPE) may, for example, be used as material for the thermoplastic layers. The inner thermoplastic layer serves as protection of the product from the aluminium foil (or carrier layer of other material, respectively). The outer thermoplastic layer is optional. It is referred to WO 2010/135843 A1 for further possible sheet material compositions.

The sheet material is bent into the shape of a typically cylinder-like container body. Adjacent overlapping edges of the sheet material with overlapping barrier layer are connected by heat-sealing resulting in a longitudinal seam. After that an optional sheathing is applied to the outside of the wound and heat-sealed sheet material to cover the longitudinal seam of the overlapping region and to obtain a container body with an entirely smooth outer surface and with a more uniform wall thickness. The sheathing typically consists of thermoplastic material. The sheathing is provided by way of extrusion, in particular extrusion coating (see U.S. Pat. No. 3,660,194 A, http//:en.wikipedia.org/wik/Plastics_extrusion).

After provision of the sheathing the container body is cut into its final length and a tube head is placed onto the container body by means of injection moulding as described in U.S. Pat. No. 3,660,194 A and WO 2010/135843 A1.

The sheathing may consist of several layers with the layers being identical with respect to their base material, the base material according to the state of the art for example being a thermoplastic polyester elastomere (TPE-E/TPC) base material (see WO 2010/135843 A1). The smooth outer surface of the sheathing can be used for imprinting (see WO 2010/135843 A1). The imprint is, however, not protected against external influences. As an alternative, WO 2010/135843 A1 discloses the use of a coloured sheathing or to employ a sheathing that consists of several layers wherein the layers contain different pigments or dyes.

Patent application DE 10 2009 051 071 A1 discloses a method for manufacturing a tube container body, wherein a sheet material is bent and longitudinal edges of the sheet material are connected by means of butt welding, the longitudinal edges being adjacent to each other but not overlapping after bending. Thus, the bent and welded sheet material has a smooth outer surface with uniform wall thickness. To secure and unburden the longitudinal seal that connects the edges a sheathing is provided on the outer surface by extrusion, such that the longitudinal seal can withstand also extreme mechanical forces or pressures. Such extreme mechanical forces or pressures can occur when manually squeezing the product out of the tube or when bending or curling the container body. The layer of the layered sheet material that is adjacent to the sheathing may be imprinted on its outside with the sheathing being transparent. The layered sheet material consists of two layers of PE with a layer of aluminium or EVOH sandwiched between the two PE layers. The sheathing also consists of PE. The sheathing may consist of several layers with one layer for example acting as adhesive layer.

Nowadays pre-imprinted laminates are usually employed that are manufactured by reverse printing. With reverse printing the imprint is applied to the inner surface of the outermost layer of the laminate. Reverse printing requires a lamination process for the production of the imprinted laminate. Reverse printing cannot be achieved by extrusion or extrusion coating. A sheathing is not provided as there is no need to protect reversely printed laminates from external influences.

SUMMARY OF THE INVENTION

It is an object of the invention to provide a method for manufacturing a container body and to provide a container body whose outside is protected from external influences, while the product contained in the container body is not jeopardized through the protection. It is a further object of the invention to provide a method for manufacturing a container body and to provide a container body comprising imprints that are protected from external influences, while the product is not jeopardized through the protection. It is a still further object of the invention to provide a method for manufacturing a container body and to provide a container body whose longitudinal seam is protected. It is a still further object of the invention to provide a method for manufacturing a container body and to provide a container body with form stability, in particular wherein collapsing of the container body is entirely or to a large extent avoided, when the product is dispensed, even if air flow into the container body is not provided for.

In order to implement these and still further objects of the invention, which will become more readily apparent as the description proceeds, a method for manufacturing a container body of a tube is provided, the method comprising the steps of imprinting a sheet material on one of its surfaces resulting in an imprint on the particular surface, forming the imprinted sheet material into the shape of the container body with the imprinted surface on its outside, sealing adjacent and in particular overlapping edges of the bent imprinted sheet material, and coating of the bent imprinted sheet material with a transparent plastics sheathing by means of extrusion, in particular extrusion coating. Thus, the sheet material is imprinted while still being in a flat state, i.e. before it is bent. The material of the plastics sheathing is chosen such that the plastics sheathing does not adhere to the imprint. Additionally or alternatively, the ink used for imprinting is chosen such that the plastics sheathing does not adhere to the imprint. This results in one or more areas of ventilation being formed between the imprinted sheet material and the plastics sheathing.

The term "bending" comprises every type of forming of the imprinted sheet material into the shape of the container body such as for example winding or folding. The adjacent and in particular overlapping edges to seal of the bent imprinted sheet material are particularly sealed by heat-sealing, especially by welding, for example butt welding.

The container body according to the invention that has been manufactured by the method of the invention comprises a bent imprinted sheet material whose adjacent and in particular overlapping edges are connected by a longitudinal seam. The sheet material is imprinted on its outer surface. Moreover, the imprinted sheet material is coated by a transparent plastics sheathing on its imprinted surface. The plastics sheathing covers the longitudinal seam. The material of the plastics sheathing and/or the ink of the imprint are chosen such that the plastics sheathing does not adhere to the imprint, resulting in one or more areas of ventilation between the imprinted sheet material and the plastics sheathing.

The imprinting of the sheet material may cover the entire surface of the sheet material it is applied to or only one or more parts of it, i.e. the imprinting may be partial. Ink is used for imprinting, with the expression "ink" on the one hand meaning any substance that contains dyes or pigments and that can be used for colouring the respective surface of the sheet material (confer http://en.wikipedia.org/wiki/Ink), wherein also black and white are considered as colours. Furthermore, transparent inks are also possible. Also varnish, in particular acrylic resin based varnish or lacquer, respectively, shall fall under the expression "ink", the varnish being coloured or not. Consequently, varnishing may also be interpreted as a type of imprinting.

The sheet material preferably comprises a laminate as has been described above and as is enclosed in WO 2010/135843 A1.

The plastics sheathing protects the imprint on the outer surface of the sheet material against external chemical, mechanical and/or physical influences. Mechanical influences may for example lead to scratching of the container body in case no sheathing is provided. Thus, the method of the invention advantageously protects the container body against scratching among others.

Sealing of the adjacent and in particular overlapping edges of the bent imprinted sheet material leads to a longitudinal seam. With the plastics sheathing this longitudinal seam is protected against external influences. Furthermore, the plastics sheathing provides the container body with a smoother surface as it covers up the longitudinal seam, in addition leading to a more uniform wall thickness.

The plastics sheathing most preferably consists of or at least comprises a chemically neutral substance whose ability to migrate through the sheet material is much lower than the migration ability of hardenable varnish, even if the plastics sheathing is thicker than a varnish layer according to the state of the art. Preferentially the substance of the plastics sheathing is not able to migrate through the sheet material. In that migration through the sheet material is avoided or at least limited contamination of the product in the container body can be avoided or at least limited. As chemically neutral substance, for example, polyolefin may be used. The plastics sheathing preferably has a thickness in the range of 0.1 to 0.9 millimeters. Moreover, particles of the imprint are prevented by the plastics sheathing from migrating to the outside of the container body.

The plastics sheathing can advantageously replace the outer varnish layer employed in the state of the art. In addition to the advantages/functions of the plastics sheathing mentioned above the haptics, the stiffness, the restoring force and/or the form stability of the container body of the tube and/or the shininess of its outer surface can be adjusted by means of the plastics sheathing, in particular by appropriate choice of the material of the plastics sheathing.

Depending on the particular application an additional layer of varnish or other decoration may be provided on the outer surface of the plastics sheathing.

As mentioned above, the material of the plastics sheathing is chosen such that the plastics sheathing does not adhere to the imprint. Additionally or alternatively, the ink used for imprinting may be chosen such that the plastics sheathing does not adhere to the imprint. To achieve non-adherence, the plastics sheathing, for example, consists of polyethylene (PE), in particular low-density polyethylene (LDPE), medium-density polyethylene (MDPE) or linear low-density polyethylene (LLDPE), or polypropylene (PP) or comprises PE, LDPE, MDPE, LLDPE or PP, with the parts of the surface of the plastics sheathing that face the imprinted surface of the sheet material and that shall not adhere to the imprint consisting of PE, LDPE, MDPE, LLDPE or PP. As the surface of the sheet material (i.e. its thermoplastic layer in the case of a laminate) that is imprinted preferably consists of an ethylene-acrylic acid copolymer, a propylene-acrylic acid copolymers, PE, LDPE or PP (polypropylene), a plastics sheathing with PE, LDPE, MDPE, LLDPE or PP as material does only adhere to the non-imprinted parts of the surface of the sheet material. If the plastics sheathing shall adhere to a sheet material surface that consists for example of ethylene-acrylic acid copolymers, PE or LDPE, as material for the plastics sheathing PE, LDPE, MDPE or LLDPE may be used. If the plastics sheathing shall adhere to a sheet material surface that consists of propylene-acrylic acid copolymers or PP, then PP is preferably used as material for the plastics sheathing. Inks used for imprinting (including varnishes) are usually acrylic resin based, e.g. acrylic resin based varnish or lacquer, respectively, to which PE, LDPE, LLDPE or PP does not adhere.

Thus, by choosing the material of the plastics sheathing and/or the ink used for imprinting such that the plastics sheathing does not adhere to the imprinted parts of the sheet material, but preferably adheres to the non-imprinted parts of the (partly) imprinted surface of the sheet material selective adhesion can be achieved with areas with ventilation being created/produced between the imprinted sheet material and the plastics sheathing. When the imprinted sheet material is coated with the plastics sheathing, air gets into these areas between the imprinted sheet material and the plastics sheathing. This advantageously results in increased form stability of the container body, with the container body basically retaining its outer shape (the shape when viewed from the outside) when the contents of the container body is dispensed even if no air enters the inside of the container body during dispensing. Hence, when dispensing a product by means of a tube that does not allow air return into the inside of the container body, only the imprinted sheet material will collapse, while the plastics sheathing—at least those parts not adhered to the imprinted sheet material—will retain the original outer shape of the container body.

The plastics sheathing may of course comprise several layers, in particular two layers with the outer layer for example consisting of or comprising a copolymer or ionomer and the inner layer consisting of or comprising PE, in particular LDPE, MDPE or LLDPE, or PP, the terms "inner" and "outer" referring to the container body. The material of the inner layer must be such that it does not adhere to the imprinted parts of the sheet material, but preferentially adheres to the non-imprinted parts of the sheet material. The layered plastics sheathing can be manufactured through coextrusion.

Appropriate location of the imprinting on the sheet material and thereby appropriate location of the areas of ventilation additionally assist in retaining the outer shape of the container body in case of product dispensing. The areas of ventilation can be distributed application dependent.

If entire adherence of the plastics sheathing on the imprinting of the sheet material is required, preferably in addition to adherence on the non-imprinted parts of the outer surface of the sheet material, the material of the plastics sheathing and/or the ink may be chosen such that the plastics sheathing does adhere to the imprint. In this case the plastics sheathing for example comprises as material an (e.g. ethylene or propylene) acrylic acid-based copolymer or ionomer or consists of it, as inks used for imprinting (including varnishes) are often acrylic resin based. With a copolymer or a ionomer also a higher transparency can be achieved as with PE or PP, such that the imprint lying beneath the plastics sheathing is better viewable. In particular, ionomer thermoplastic resin or the more specific E/MAA (ethylene/methacrylic acid) copolymer or other highly transparent copolymer materials are used as plastics sheathing. Also in this case a plastics sheathing consisting of several layers may be used, for example with two layers with one layer consisting of a ionomer or a copolymer and the other layer consisting of PE or PP. The layer consisting of a ionomer or a copolymer preferably constitutes the inner layer to achieve good adherence to the imprint. In particular by means of the outer PE or PP layer further properties of the outer surface of the container body can be set such as optical effects, stiffness, haptics or similar.

In case the plastics sheathing shall adhere to the imprint, at least part of the imprinted sheet material is preferably coated with a transparent layer on its imprinted, outer side, in particular by way of lamination or extrusion, before the imprinted sheet material is bent into the shape of the container body, i.e. with the imprinted sheet material still being in a flat state. An adhesive layer may be provided between the transparent layer and the imprinted sheet material. The transparent layer may consist of PE for example. In this way transfer of ink from the imprinted surface of the sheet material onto the not imprinted opposite surface of the sheet material can advantageously be avoided, which otherwise might occur if the imprinted sheet material is, for example, temporarily rolled up for intermediate storage. Provision of the transparent layer allows the partly coated imprinted sheet material to be rolled up for temporary storage, whereby a copy of the imprint on the inner side of the sheet material can be avoided.

BRIEF DESCRIPTION OF THE DRAWINGS

Further advantageous features and applications of the invention can be found in the dependent claims as well as in the following description of the drawings illustrating the invention. In the drawings like reference signs designate the same or similar parts throughout the several figures of which:

DESCRIPTION OF THE PREFERRED EMBODIMENTS

Figure 1:
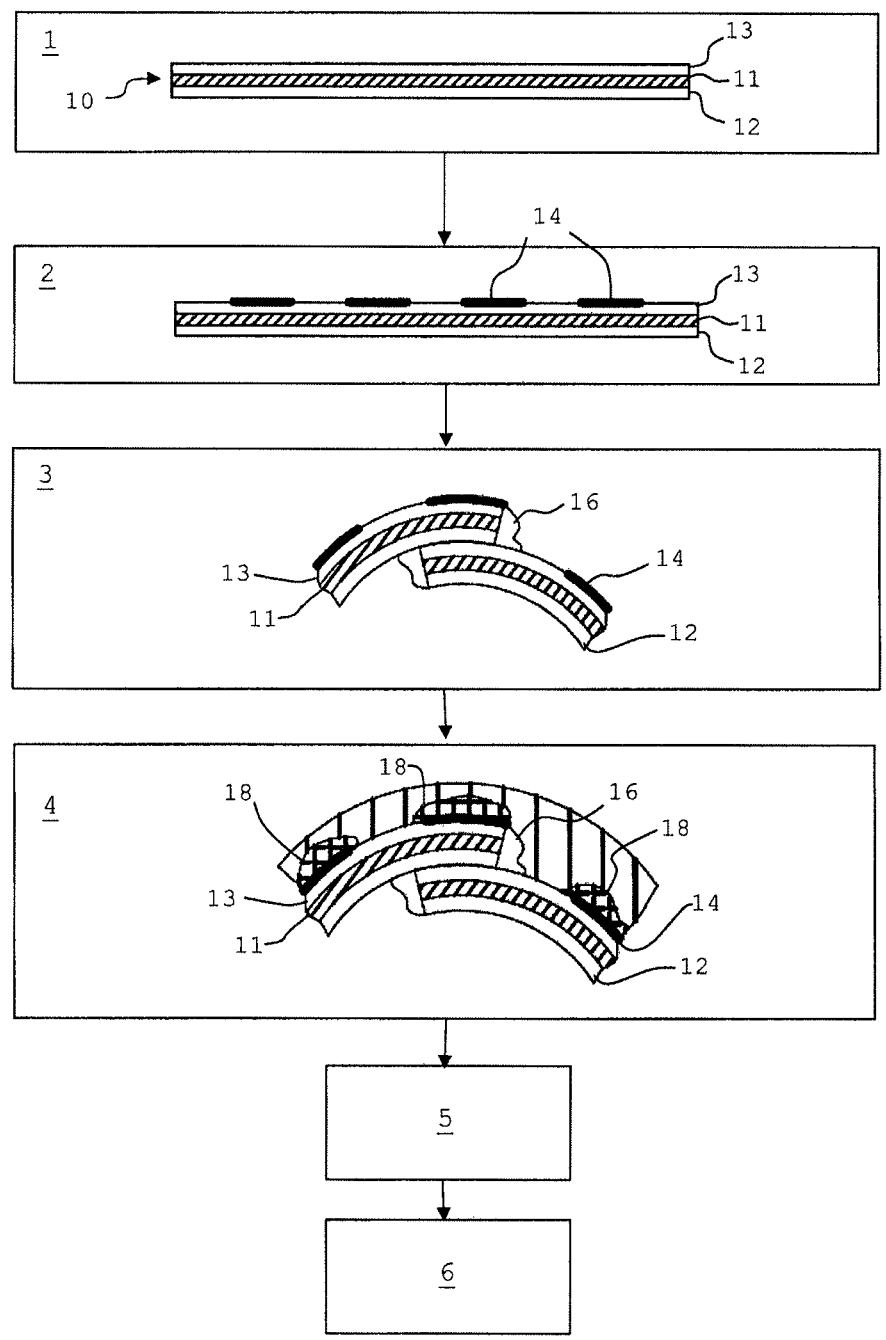
FIG. 1 depicts a sequence of operation diagram of a method of the invention.

FIG. 1 shows a sequence of operation diagram of a method for manufacturing a container body according to the invention. In a first step 1 a sheet material 10 is provided that shall form the container body, the sheet material preferably being a laminate. The sheet material 10 may be pre-manufactured. The sheet material 10 preferably comprises a carrier layer 11 of, for example, aluminium and two thermoplastic layers 12, 13, the carrier layer 11 being sandwiched between the thermoplastic layers 12, 13. The carrier layer 11 is coated with the thermoplastic layers 12, 13 by means of lamination or extrusion coating with adhesive layers (not shown) between the carrier layer 11 and the thermoplastic layers 12, 13. The thermoplastic layers 12, 13 preferably consist of PE, in particular LDPE (low-density polyethylene), LLDPE (linear low-density polyethylene) or MDPE (medium-density polyethylene)). For delivery or temporary storage the sheet material 10 may be rolled up, preferentially already cut into the width required for the container body.

In step 2, the sheet material 10 is imprinted on its outer surface with an imprint 14, the term "outer" referring to the container body. Digital printing (http://en.wikipedia.org/wiki/Digital_printing) or flexographic printing (http://en.wikipedia.org/wiki/Flexography) is preferably used for imprinting. Also indirect offset printing may be used. If the sheet material 10 has been rolled up for temporary storage or delivery, imprinting is preferably performed during unrolling of the sheet material 10. Those edges/parts of the sheet material 10 that overlap when bent into the shape of the container body are preferably not imprinted. I.e. preferably there is no ink on overlapping parts of the imprinted sheet material that face each other after bending, such that rolling up for temporary storage does not lead to copying of ink onto the opposite non-imprinted surface of the sheet material.

In step 3 the imprinted sheet material is first bent into the shape of the container body of the tube to be produced, the imprinted surface of the sheet material being on the outside. Then the adjacent and overlapping edges 15 of the bent imprinted sheet material are longitudinally sealed which results in a longitudinal seam 16. The longitudinal seam 16 comprises the molten material of the thermoplastic layers 12 and 13. The sealing is preferentially accomplished through butt welding. Step 2 is preferably performed in-line with step 3 such that the imprinted sheet material advantageously does not need to be rolled up for temporary storage before step 3 is performed, which might in particular with offset printing lead to a direct copy of the imprint onto the inner side of the sheet material, the term "inner" referring to the container body, in case overlapping parts/edges of the sheet material have been imprinted.

In step 4 the bent imprinted sheet material, including the longitudinal seam 16, is coated with a transparent plastics sheathing 17 on its outside by means of extrusion. PE, LDPE, MDPE or LLPE is preferably used as material for the plastics sheathing 17 such that the plastics sheathing 17 adheres to the non-imprinted parts of the thermoplastic layer 13 but not to the acrylic resin based imprint 14. Through non-adherence to the imprint 14 ventilation areas 18 are formed between the imprint 14 and the plastics sheathing 17.

In step 5 the tube head is moulded onto the container body. It is referred to U.S. Pat. No. 3,660,194 A and WO 2010/135843 A1 for details regarding the provision of the tube head.

In step 6 after-decoration of the outside of the container body may be performed such as further imprinting, varnishing, hot stamping, silk screen decoration, etc. on the plastics sheathing 17. Step 6 is optional.

Figure 2:
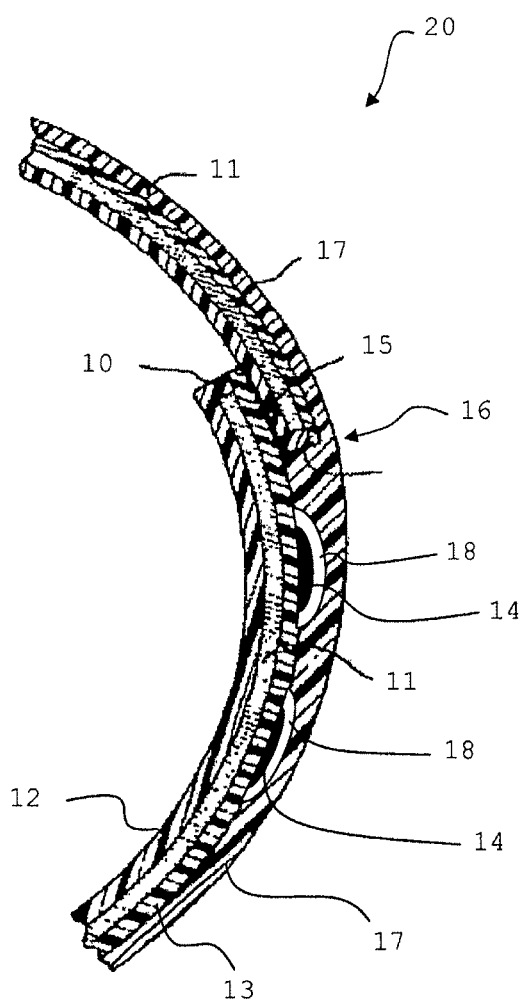
FIG. 2 depicts part of a container body manufactured according to the method of the invention in cross-sectional view.

FIG. 2 shows part of a container body 20 manufactured by the method according to the invention. The container body 20 comprises a sheet material 10 in form of a laminate with a carrier layer 11 sandwiched between two thermoplastic layers 12, 13. Overlapping edges 15 of the sheet material are sealed leading to a longitudinal seam 16. The sheet material 10 is imprinted on the outer surface of its outer thermoplastic layer 13 with imprints 14. Furthermore, the imprinted sheet material is coated on its outside with a plastics sheathing 17. The material of the plastics sheathing 17 is chosen such that is does not adhere to the imprint 14 leading to areas of ventilation 18 being formed between the imprint 14 and the plastics sheathing 17. To achieve this, PE, in particular LDPE, MDPE or LLDPE, or PP is preverably used as material for the plastics sheathing. The plastics sheathing 17 may comprise several, in particular two, extruded layers with the outer layer for example consisting of a copolymer or a ionomer and the inner layer consisting of LPDE, wherein the layered plastics sheathing 17 is manufactured through coextrusion.

Figure 3:
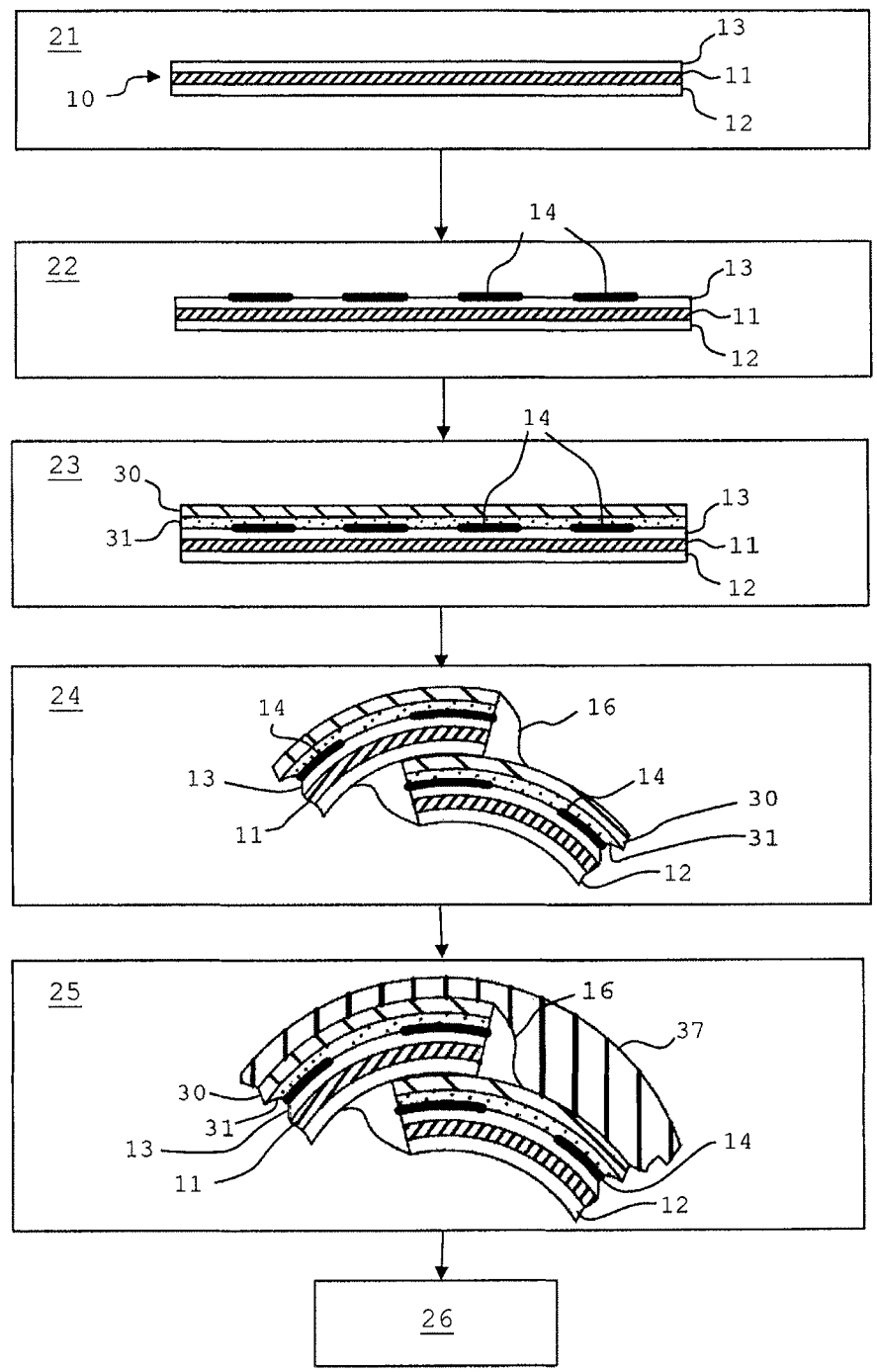
FIG. 3 depicts a sequence of operation diagram of a method for manufacturing a container body and a tube, wherein the plastics sheathing adheres to the imprint.

FIG. 3 shows a method for manufacturing a tube with the plastics sheathing 37 of the respective container body adhering to the imprint 14. Steps 21 and 22 correspond to steps 1 and 2 of the method of the invention depicted in FIG. 1 and it is referred to the above description thereof.

Step 23 is optional. In step 23 the imprinted thermoplastic layer 13 of the sheet material 10 is coated with a transparent layer 30 for example by lamination or extrusion. An adhesive layer 31 is preferably provided between the imprinted thermoplastic layer 13 and the transparent layer 30. To achieve good adherence the transparent layer 30 preferably consists of PE or PP or similar in dependence on the material of the thermoplastic layer 13. The transparent layer 30 covers the imprint 14 such that even those parts of the sheet material 10 may be imprinted that face each other when rolled up, for example, for temporary storage. The transparent layer 30 does not permit transfer of ink from the imprinted surface of the sheet material 10 to the inner surface of the sheet material 10 when rolled up.

Step 24 basically corresponds to step 3 in FIG. 1 and it is referred to the above description thereof, but with the thermoplastic layer 13 being coated with the (optional) transparent layer 30 and the (optional) adhesive layer 31.

In step 25, a transparent plastics sheathing 37 is applied onto the outer surface of the bent imprinted sheet material by way of extrusion. Optionally, the transparent layer 30 and the adhesive layer 31 may have been provided on the outer surface of the imprinted sheet material. For the plastics sheathing 37 to adhere to the imprint 14 its material consists preferably of an ethylene- or a propylene-acrylic acid copolymer or ionomer as the ink of the imprint 14 usually is acrylic resin based. Whether an ethylene- or a propylene-acrylic acid copolymer or ionomer is used depends on the material of the thermoplastic layer 13, i.e. whether it is PE, LDPE, LLDPE or PP.

Step 26 corresponds to step 5 in FIG. 1 and it is referred thereto. Optionally, step 26 may be followed by a step 6 as depicted in and described in connection with FIG. 1.

It is to be understood that while certain embodiments of the present invention have been illustrated and described herein, it is not to be limited to the specific embodiments described and shown.

What is claimed is:

1. A method for manufacturing a container body (20) of a tube, comprising the following steps:
   imprinting a sheet material (10) with an ink on one of its surfaces,
   bending the imprinted sheet material into the shape of the container body (20) of the tube, with the imprinted surface on the outside, and with two oppositely disposed edges of the sheet material positioned in adjacent relationship,
   sealing the adjacent edges (15) of the bent imprinted sheet material, and
   coating the bent imprinted sheet material with a transparent plastics sheathing (17) by extrusion,
   characterized in that the material of the plastics sheathing (17) and/or the ink used for imprinting are chosen such that the plastics sheathing (17) does not adhere to the imprint (14), resulting in one or more ventilation areas (18) being formed between the imprinted sheet material and the plastics sheathing (17).

2. The method according to claim 1, wherein the material of the plastics sheathing (17) comprises polyethylene (PE), in particular low-density polyethylene (LDPE), medium-density polyethylene (MDPE) or linear low-density polyethylene (LLDPE), or polypropylene (PP).

3. The method according to claim 2, wherein the plastics sheathing (17) has a thickness in the range of 0.1 to 0.9 millimeters.

4. The method according to claim 2, wherein the plastics sheathing (17) consists of several layers.

5. The method according to claim 2, wherein the adjacent edges (15) of the bent imprinted sheet material overlap.

6. A container body for a tube, the container body (20) being manufactured by the method of claim 2 and comprising a bent imprinted sheet material whose adjacent edges (16) are connected by a longitudinal seam (16), the sheet material (10) being imprinted on its outer surface with an ink, wherein the imprinted sheet material is coated by a transparent plastics sheathing (17) on its outer surface, the plastics sheathing (17) covering the longitudinal seam (16), characterized in that the material of the plastics sheathing (17) and/or the ink of the imprint (14) are chosen such that the plastics sheathing (17) does not adhere to the imprint (14) such that one or more areas of ventilation (18) are formed between the imprinted sheet material and the plastics sheathing (17).

7. The method according to claim 1, wherein the plastics sheathing (17) has a thickness in the range of 0.1 to 0.9 millimeters.

8. The method according to claim 7, wherein the plastics sheathing (17) consists of several layers.

9. The method according to claim 7, wherein the adjacent edges (15) of the bent imprinted sheet material overlap.

10. A container body for a tube, the container body (20) being manufactured by the method of claim 7 and comprising a bent imprinted sheet material whose adjacent edges (16) are connected by a longitudinal seam (16), the sheet material (10) being imprinted on its outer surface with an ink, wherein the imprinted sheet material is coated by a transparent plastics sheathing (17) on its outer surface, the plastics sheathing (17) covering the longitudinal seam (16), characterized in that the material of the plastics sheathing (17) and/or the ink of the imprint (14) are chosen such that the plastics sheathing (17) does not adhere to the imprint (14) such that one or more areas of ventilation (18) are formed between the imprinted sheet material and the plastics sheathing (17).

11. The method according to claim 1, wherein the plastics sheathing (17) consists of several layers.

12. The method according to claim 11, wherein the adjacent edges (15) of the bent imprinted sheet material overlap.

13. A container body for a tube, the container body (20) being manufactured by the method of claim 11 and comprising a bent imprinted sheet material whose adjacent edges (16) are connected by a longitudinal seam (16), the sheet material (10) being imprinted on its outer surface with an ink, wherein the imprinted sheet material is coated by a transparent plastics sheathing (17) on its outer surface, the plastics sheathing (17) covering the longitudinal seam (16), characterized in that the material of the plastics sheathing (17) and/or the ink of the imprint (14) are chosen such that the plastics sheathing (17) does not adhere to the imprint (14) such that one or more areas of ventilation (18) are formed between the imprinted sheet material and the plastics sheathing (17).

14. The method according to claim 1, wherein the adjacent edges (15) of the bent imprinted sheet material overlap.

15. A container body for a tube, the container body (20) being manufactured by the method of claim 14 and comprising a bent imprinted sheet material whose adjacent edges (16) are connected by a longitudinal seam (16), the sheet material (10) being imprinted on its outer surface with an ink, wherein the imprinted sheet material is coated by a transparent plastics sheathing (17) on its outer surface, the plastics sheathing (17) covering the longitudinal seam (16), characterized in that the material of the plastics sheathing (17) and/or the ink of the imprint (14) are chosen such that the plastics sheathing (17) does not adhere to the imprint (14) such that one or more areas of ventilation (18) are formed between the imprinted sheet material and the plastics sheathing (17).

16. A container body for a tube, the container body (20) being manufactured by the method of claim 1 and comprising a bent imprinted sheet material whose adjacent edges (16) are connected by a longitudinal seam (16), the sheet material (10) being imprinted on its outer surface with an ink, wherein the imprinted sheet material is coated by a transparent plastics sheathing (17) on its outer surface, the plastics sheathing (17) covering the longitudinal seam (16), characterized in that the material of the plastics sheathing (17) and/or the ink of the imprint (14) are chosen such that the plastics sheathing (17) does not adhere to the imprint (14) such that one or more areas of ventilation (18) are formed between the imprinted sheet material and the plastics sheathing (17).

17. The container body according to claim 16, wherein the material of the plastics sheathing (17) comprises polyethylene (PE), in particular low-density polyethylene (LDPE), medium-density polyethylene (MDPE) or linear low-density polyethylene (LLDPE), or polypropylene (PP).

18. The container body according to claim 16 wherein the plastics sheathing (17) has a thickness in the range of 0.1 to 0.9 millimeters.

19. The container body according to claim 16, wherein the plastics sheathing (17) consists of several layers.

20. The container body according to claim 16, wherein the adjacent edges (15) of the bent imprinted sheet material overlap.

* * * * *